United States Patent
Gladstone et al.

(10) Patent No.: US 7,594,267 B2
(45) Date of Patent: Sep. 22, 2009

(54) STATEFUL DISTRIBUTED EVENT PROCESSING AND ADAPTIVE SECURITY

(75) Inventors: Philip J. S. Gladstone, Framingham, MA (US); Jeffrey A. Kramer, Wellesley, MA (US)

(73) Assignee: Cisco Technology, Inc., San Jose, CA (US)

( * ) Notice: Subject to any disclaimer, the term of this patent is extended or adjusted under 35 U.S.C. 154(b) by 768 days.

(21) Appl. No.: 10/172,305

(22) Filed: Jun. 14, 2002

(65) Prior Publication Data

US 2002/0194495 A1   Dec. 19, 2002

Related U.S. Application Data

(60) Provisional application No. 60/298,592, filed on Jun. 14, 2001.

(51) Int. Cl.
*G06F 7/04* (2006.01)
*G06F 9/00* (2006.01)
*G06F 11/00* (2006.01)
*H04N 7/16* (2006.01)

(52) U.S. Cl. .............................. 726/23; 726/11; 726/27; 725/25

(58) Field of Classification Search ......... 713/190–210, 713/189; 726/23, 22, 11, 27; 709/223; 725/25
See application file for complete search history.

(56) References Cited

U.S. PATENT DOCUMENTS

| | | | | |
|---|---|---|---|---|
| 4,647,944 A * | 3/1987 | Gravesteijn et al. | .......... | 347/264 |
| 5,039,980 A * | 8/1991 | Aggers et al. | ................ | 340/506 |
| 5,107,249 A * | 4/1992 | Johnson | ........................ | 340/541 |
| 5,761,502 A * | 6/1998 | Jacobs | ..................... | 707/103 R |
| 6,282,175 B1 * | 8/2001 | Steele et al. | ................. | 370/254 |
| 6,321,338 B1 * | 11/2001 | Porras et al. | ................... | 726/25 |
| 6,405,250 B1 * | 6/2002 | Lin et al. | ..................... | 709/224 |
| 6,412,003 B1 * | 6/2002 | Melen | ......................... | 709/225 |
| 6,496,575 B1 * | 12/2002 | Vasell et al. | ........... | 379/102.05 |
| 6,691,244 B1 * | 2/2004 | Kampe et al. | .................. | 714/4 |
| 6,708,212 B2 * | 3/2004 | Porras et al. | ................. | 709/224 |
| 6,839,850 B1 * | 1/2005 | Campbell et al. | ............. | 726/23 |

(Continued)

FOREIGN PATENT DOCUMENTS

WO    WO 99/60462    11/1999

(Continued)

OTHER PUBLICATIONS

Anita K. Jones and Robert S. Sielken ; Computer System Intrusion Detection: A Survey; University of Virginia, 2000.*

(Continued)

*Primary Examiner*—Nasser G Moazzami
*Assistant Examiner*—Mohammad W Reza

(57) ABSTRACT

The invention provides method and apparatus for maintaining a networked computer system including first and second nodes and an event processing server, the method comprising the first and second nodes detecting changes in state, the event processing server receiving notification of the changes in state from the first and second nodes, the event processing server correlating changes in state detected in the first and second nodes, and the event processing server executing a maintenance decision which affects the first and second nodes. The detecting, transmitting, correlating, and executing occurs without human intervention.

41 Claims, 6 Drawing Sheets

U.S. PATENT DOCUMENTS

| | | | |
|---|---|---|---|
| 6,973,488 B1* | 12/2005 | Yavatkar et al. | 709/223 |
| 6,986,133 B2* | 1/2006 | O'Brien et al. | 717/173 |
| 6,988,208 B2* | 1/2006 | Hrabik et al. | 726/23 |
| 2002/0082886 A1* | 6/2002 | Manganaris et al. | 705/7 |

FOREIGN PATENT DOCUMENTS

WO     WO 01/31420 A2     5/2001

OTHER PUBLICATIONS

R Gopal; Layered model for supporting fault isolation and recovery; 2000.*

R Bueschkes, M Borning, D Kesdogan; Transaction-based Anomaly Detection; Workshop on Intrusion Detection and Network Monitoring, 1999.*

Anderson, Debra et al., "Next-generation Intrusion Detection Expert System (NIDES) A Summary," Technical Report SRI-CSL-95-07, Computer Science Laboratory, SRI International, May 1995, 47 pgs.

Neumann, Peter G. et al., "Experience with EMERALD to Date", 1st USENIX Workshop on Intrusion Detection and Network Monitoring, Santa Clara, California, Apr. 11-12, 1999, pp. 73-80.

Snapp, Steven R. et al., "DIDS (Distributed Intrusion Detection System)—Motivation, Architecture, and An Early Prototype", Proceedings of $14^{th}$ National Computer Security Conference, Washington, D.C., Oct. 1991, pp. 167-176.

Spafford, Eugene H. et al., "Intrustion detection using autonomous agents", Computer Networks 34 (2000), pp. 547-570.

Wallach, Dan S. et al., "Understanding Java Stack Inspection", IEEE Proceedings of Security & Privacy, May 1998, pp. 1-12.

Vigna G, et al. "NetSTAT: A Network-Based Intrusion Detection Approach," Computer Security Applications Conference, 1998. Proceedings. $14^{th}$ Annual Phoenix, AZ, USA Dec. 7-11, 1998, Los Alamitos, CA, USA, IEEE Comput. Soc, US, Dec. 7, 1998 pp. 25-34, XP010318630.

Experience with EMERALD to Date, Peter G. Neumann and Phillip A. Porras, Computer Science Laboratory, SRI International, Menlo Park, CA 94025-3493, $1^{st}$ USENIX Workshop on Intrusion Detection and Network Monitoring Santa Clara, California, Apr. 11-12, 1999, pp. 73-80, BSNDOCID, XP-002230356.

Garcia, et al. "Boundry Expansion of Expert Systems: Incorporating Evolutionary Computation With Intrusion Detection Solutions," Proceedings IEEE Southeastcon 2001. Engineering the Future. Clemson, SC, Mar. 30-Apr. 1, 2001, IEEE Southeastcon, New York, NY: IEEE, US, Mar. 30, 2001, pp. 96-99, XP010542589.

A System for Distributed Intrusion Detection, Steven R. Snapp, et al. "A System for Distributed Intrusion Detection," COMPCON Spring 91. Digest of Papers San Francisco, CA, USA Feb. 25-Mar. 2, 1991, Los Alamitos, CA, USA, IEEE Comput. Soc, US, Feb. 25, 1991, pp. 170-176, XP010022505.

* cited by examiner

STATEFUL DISTRIBUTED EVENT PROCESSING AND ADAPTIVE SECURITY

CROSS-REFERENCE TO RELATED APPLICATIONS

This application claims priority to provisional U.S. application Ser. No. 60/298,592 filed Jun. 14, 2001 and entitled Stateful Distributed Event Processing and Adaptive Security, the disclosures of which are incorporated herein by reference.

This application is also related to co-pending U.S. application Ser. No. 10/071,328 filed Feb. 8, 2002 and entitled Stateful Reference Monitor, the disclosures of which are incorporated herein by reference.

BACKGROUND

This invention relates to computer network security, and more particularly to methods and apparatus for securing one or more nodes on a computer network.

Conventional network security systems can be said to provide either "active" or "passive" protection. Active security systems provide real-time barriers to intrusions, via software- or hardware-based pre-programmed intrusion detection measures. "Passive" systems provide the ability to detect and recover from previously observed security breaches, by examining data gathered about previous system access activity, so as to improve static access controls and policies over time. Active systems, then, function primarily to prevent intrusions, and passive systems function primarily to report on and examine data about previous intrusions to prevent future intrusions.

Examples of conventional active security systems include access control tools, content filtering tools, and system auditing tools. Access control tools, such as network firewalls, can be deployed on dedicated machines, usually at a network perimeter, to control inbound and outbound access using pre-configured permission levels. Content filtering tools, like computer virus scanners, typically execute on either an e-mail server or a workstation, and function by screening incoming content, like e-mail and attached files, for potentially threatening matter, based on known signatures of previously observed attacks. System auditing tools, like reference monitors, may provide either stateless or state-based monitoring (such as the state-based monitoring provided by the stateful reference monitor described in U.S. patent application Ser. No. 10/071,328 and incorporated by reference herein) of individual workstations or servers, by identifying variations from either pre-determined settings or a dynamic machine state.

Examples of conventional passive security systems include activity logging tools and auditing tools, which may be employed in conjunction with one another. Activity logging tools track the activity of one or more computers and transcribe observed system activity to a series of log files as individual entries. Auditing tools typically examine those log entries to discern breaches, attacks, or other potentially threatening activity, occurring either across machines or within individual machines.

Both types of security systems provide useful intrusion detection and prevention functions. However, both generally rely on pre-programmed network administration policy, business rules, or other parameters, and so neither (particularly passive systems) provides the adaptation capability sometimes necessary to counter novel types of attacks as they occur. Also, conventional active systems are unable to observe and correlate seemingly innocuous activity as it occurs across nodes to determine that an intrusion is in progress. Given the growing ubiquity of computer networks and the value of electronic assets, commensurate growth of network security threats is to be expected. Therefore, a security system which provides adaptive countermeasures in real time to localized (i.e., limited to one node) or non-localized intrusions would provide tremendous value to operators of computer networks.

SUMMARY OF THE INVENTION

A first embodiment of the invention provides a method of maintaining a networked computer system including first and second nodes and an event processing server, comprising the first and second nodes detecting changes in state, the event processing server receiving notification of the changes in state from the first and second nodes, the event processing server correlating changes in state detected in the first and second nodes, and the event processing server executing a maintenance decision which affects the first and second nodes, wherein the detecting, transmitting, correlating, and executing occurs without human intervention.

This embodiment may be practiced wherein the changes in state are a result of at least one of an event and the absence of an event, wherein the changes in state are recognized by a reference monitor, and/or wherein the event processing server receiving the report is the result of one of the first and second nodes reporting to the event processing server and the event processing server polling the first and second nodes. The embodiment may further include the event processing server updating an operating policy on the network, and updating the operating policy may include at least one of requesting security policy changes on at least one node, requesting changes to privileges to access system resources on at least one node, tuning system parameters on at least one node, and modifying network firewall parameters. At least one node may further enact the updated operating policy. Also, the embodiment may further include notifying an external entity of actions taken, and the external entity may be a network administrator or a software application executing on the network.

A second embodiment of the invention provides a method for maintaining a networked computer system including at least one node detecting a change in state, an event processing server on the network receiving notification of the at least one change in state from the at least one node, and the event processing server responding to the notification by executing a maintenance decision, wherein the detecting, receiving, and responding occurs without human intervention.

This embodiment may be practiced wherein the change in state is a result of at least one of an event and the absence of an event, wherein the change in state is recognized by a reference monitor, wherein the event processing server receiving the report is the result of one of the node reporting to the event processing server and the event processing server polling the node, and may be practiced wherein the maintenance decision affects the at least one node detecting the change in state, and/or wherein the maintenance decision affects at least one node other than the node detecting the change in state. The embodiment may further include the event processing server updating an operating policy on the network, wherein updating the operating policy may include at least one of requesting security policy changes on at least one node, requesting changes to privileges to access system resources on at least one node, tuning system parameters on at least one node, and modifying network firewall parameters. The embodiment may still further include at least one node enacting the updated operating policy, and/or notifying an external entity of actions taken, wherein the external entity is a network administrator or a software application executing on the network.

A third embodiment of the invention provides a method for maintaining a node on a networked computer system including at least one node detecting a change in state, and the at least one node reacting to the change in state, wherein the at least one node detecting and reacting occurs without human intervention.

The embodiment may be practiced wherein the change in state is a result of at least one of an event and the absence of an event, and/or wherein the change in state is recognized by a stateful reference monitor. The embodiment may further include at least one node notifying an event processing server on the network, the event processing server responding to the notification by updating an operating policy on the network, wherein updating the operating policy includes at least one of requesting updates to security policy on at least one node, requesting changes to privileges to access system resources on at least one node, tuning system parameters on at least one node, and modifying network firewall parameters. The embodiment may further include the at least one node enacting the updated operating policy, and/or notifying an external entity of actions taken, wherein the external entity is a network administrator and/or a software application executing on the network.

A fourth embodiment of the invention provides a computer-readable medium having instructions recorded thereon, which instructions, when executed, enable at least one processor in a networked computer system to detect a change in state of a node, and process instructions defining reacting to the detected change in state.

The embodiment may further include instructions defining communicating the change in state to an event processing server, instructions defining processing maintenance instructions received from the event processing server, and/or instructions defining transmitting notification to a network administrator of actions taken.

A fifth embodiment of the invention provides a computer-readable medium having instructions recorded thereon, which instructions, when executed, enable at least one processor in a networked computer system to maintain an operating policy for the network, receive notification of a change in state from at least one node, and update the operating policy based on the change in state.

The embodiment may further include instructions defining storing received notifications of changes in state in memory, instructions defining correlating notifications received from a plurality of nodes, instructions defining storing received notifications in electronic file storage, and/or instructions defining notifying an external entity of actions taken, wherein the external entity is a network administrator or a software application executing on the network.

A sixth embodiment of the invention provides a method for maintaining a networked computer system including at least one node detecting a change in state, an event processing server on the network receiving notification of the at least one change in state from the at least one node, and the event processing server responding to the notification by dispensing a maintenance decision.

The embodiment may further comprise executing, by a human operator, the maintenance decision on at least one node on the networked computer system, or executing, without human intervention, the maintenance decision on at least one node on the networked computer system. A human operator may be prompted and allotted a predetermined period to execute the maintenance decision before it is executed without human intervention.

DETAILED DESCRIPTION

Aspects of embodiments of the present invention provide methods and apparatus for securing a networked computer system through the coordinated execution of reference monitor and event agent software on individual nodes, and event processing server software on a network server, for achieving active security measures, administrative control, and the ability to correlate potentially threatening activity across multiple nodes in real time.

Figure 4:
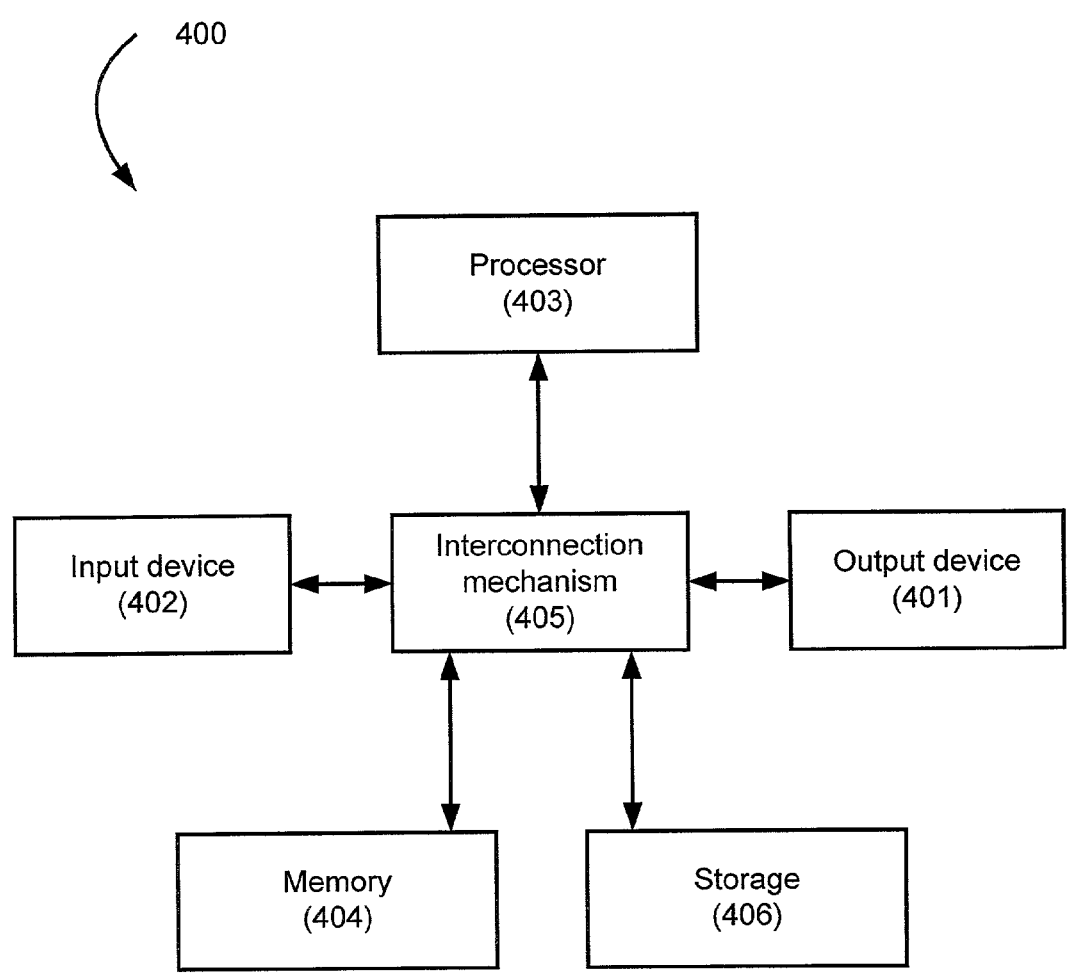
FIG. 4 is a block diagram of an exemplary computer system on which aspects of embodiments of the invention may be implemented.

Computer system 400, shown in FIG. 4, with which aspects of these embodiments, either individually or in combination, may be implemented, may include at least one main unit connected to both one or more output devices 401 which store information, transmit information or display information to one or more users or machines, and one or more input devices 402 which receives input from one or more users or machines. The main unit may include one or more processors 403 connected to a memory system 404 via one or more interconnection mechanisms 405, such as a bus or switch. Any input device 402 and/or output device 401 are also connected to the processor 403 and memory system 404 via the interconnection mechanism 405. The computer system 400 may further include a storage system 406 in which information is held on or in a non-volatile medium. The medium may be fixed in the system or may be removable.

Alternatively, computer system 400 may be distributed, and therefore may not include a main unit. In particular, input devices 402, processors 403, memory systems 404, interconnection mechanisms 405, and storage systems 406 may each comprise individual or multiple computer systems, and may be geographically disparate. For example, storage systems 406 may comprise a server farm residing in New York which communicates with a processor 403 residing in Pennsylvania, via the Internet, which serves as interconnection mechanism 405.

Computer system 400 may be a general purpose computer system which is programmable using a computer programming language. Computer programming languages suitable for implementing such a system include procedural programming languages, object-oriented programming languages, combinations of the two, or other languages. The computer system may also be specially programmed, special purpose hardware, or an application specific integrated circuit (ASIC).

In a general purpose computer system, the processor is typically a commercially available processor which executes a program called an operating system, which controls the execution of other computer programs and provides scheduling, debugging, input/output control, accounting, compilation, storage assignment, data management, memory management, communication control and related services. The processor and operating system defines the platform for which application programs in other computer programming languages are written. The invention is not limited to any particular processor, operating system or programming language.

Figure 5:
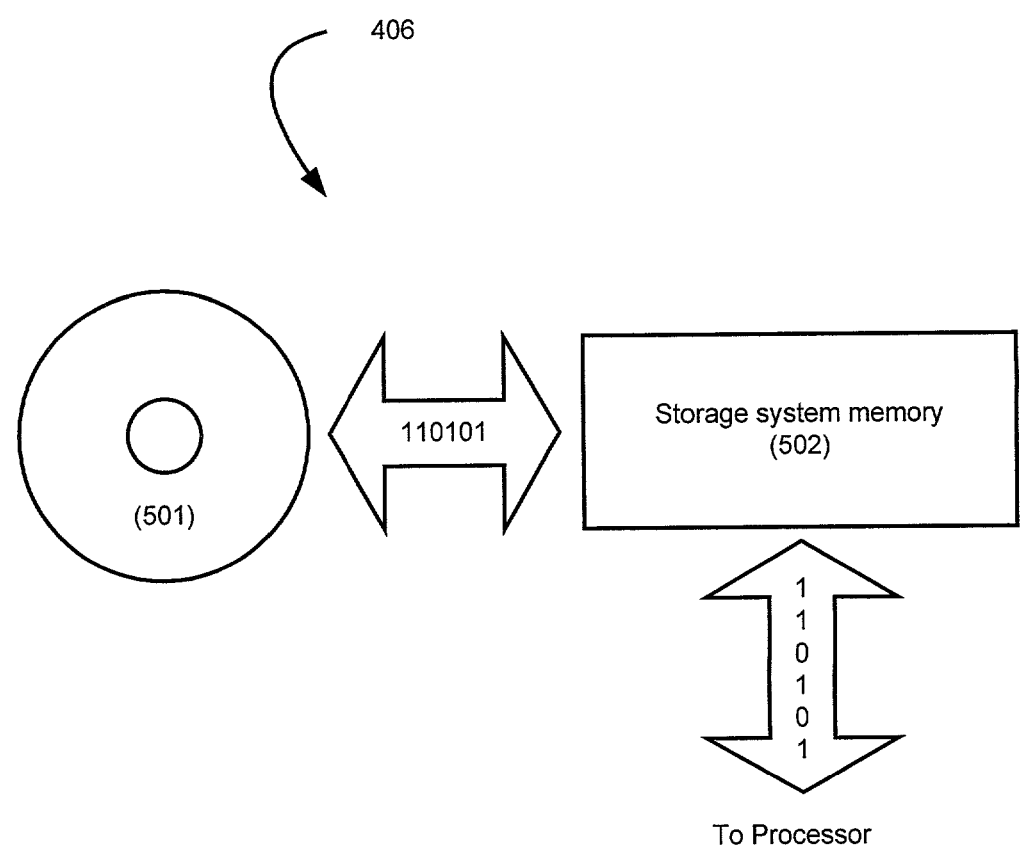
FIG. 5 is a block diagram depicting exemplary computer system components with which aspects of embodiments of the invention may be implemented.

Storage system 406, shown in greater detail in FIG. 5, typically includes a computer-readable and computer-writeable non-volatile recording medium 501, in which data is stored that define a program to be executed by the processor, or information stored to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

Aspects of embodiments of the invention may be implemented in software, hardware or firmware, or any combination thereof. The various elements of an embodiment, either individually or in combination, may be implemented as a computer program product including a computer-readable medium, e.g. storage 406, on which instructions are stored for access and execution by a processor, e.g. processor 403. When executed by the processor 403, the instructions instruct the processor 403 to perform the various steps of the process.

Figure 1:
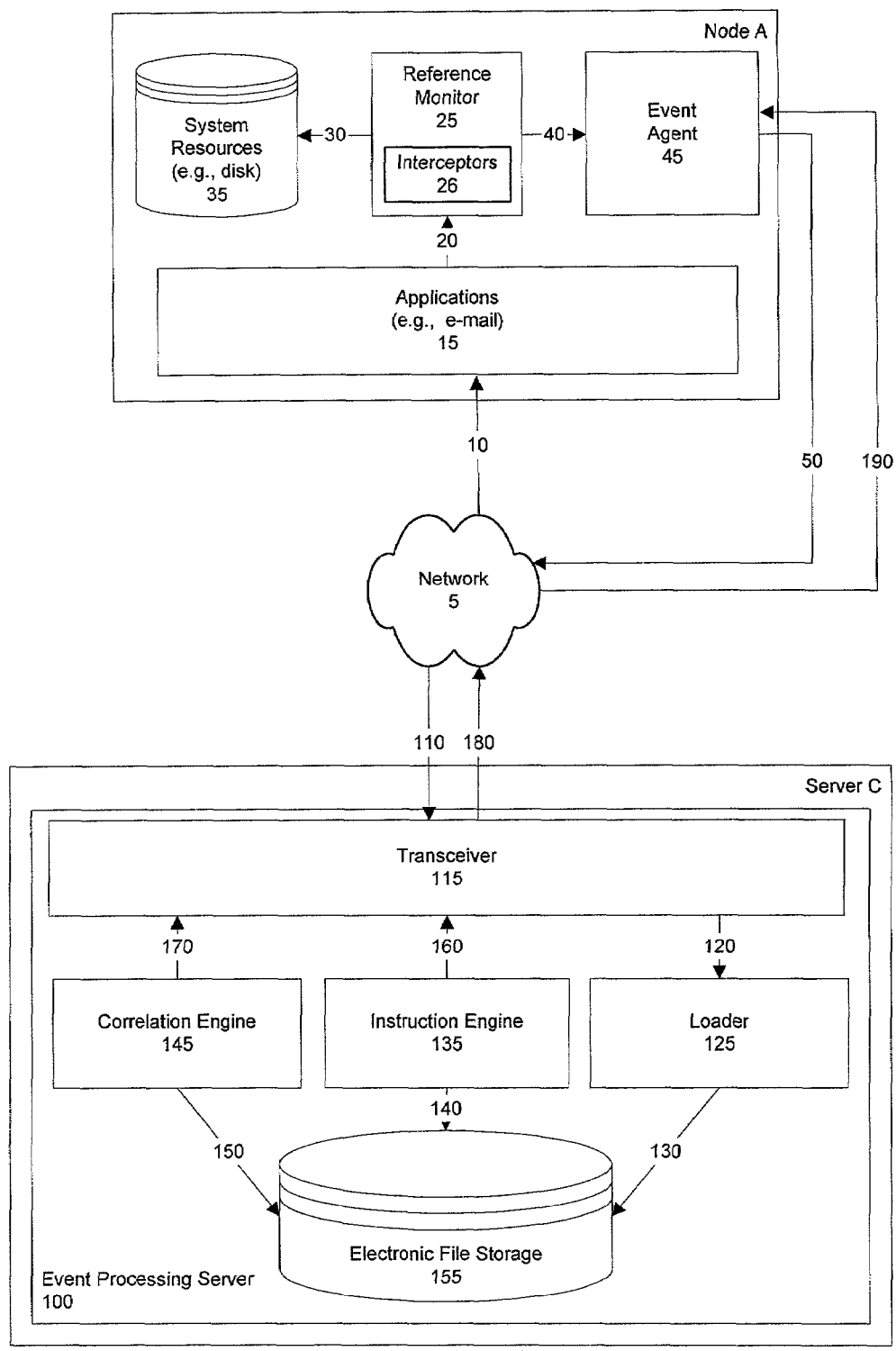
FIG. 1 is a functional block diagram depicting the interaction of system components which define aspects of at least one embodiment of the invention.

FIG. 1 is a functional block diagram depicting the relationship between system components, such as those described above, adapted to enable aspects of embodiments of the invention.

Reference Monitor 25 executes on Node A, which may be a workstation, server, or other computer on the network. Reference Monitor 25 may be a software application, which may execute on Node A synchronously, asynchronously, or both, providing continuous monitoring capability. Reference Monitor 25 may be adapted to execute on nodes running any commercially prevalent operating system such as UNIX, LINUX, Windows NT, and others. Reference Monitor 25 acts to detect and intercept local node operations and/or network-originated requests through which the operating system and/or user applications attempt to access system resources on the node. In some embodiments, in order to monitor system events, Reference Monitor 25 comprises Interceptors 26, which are inserted in the control or communication paths traversed by those events. For example, if an particular monitored event is a network access request, an Interceptor 26 may be inserted in the operating system at a point where the network access request is communicated from one portion of the operating system to another. Interceptor 26 may generate an event message for each event intercepted. Event messages may then be communicated to Reference Monitor 25, which may return a policy message to Interceptor 26. The policy message may be an action for Interceptor 26 to take, such as allowing an access request event to continue along the control or communication path so that it has its intended effect, or not allowing the event to pass along the path. Reference Monitor 25 may instead, or also, construe the absence of an anticipated request for system resources as a harmful activity. In these embodiments, Reference Monitor 25 may interpret an overall absence of event messages, of certain types of event messages, or of event messages received within a certain timeframe, for example, as cause to return a policy message to Interceptor 26, such as an instruction to not to allow an event to continue along its intended path.

Event Agent 45 also executes on Node A, and in this embodiment is a software application which executes continuously in the background on Node A. Event Agent 45 executes in conjunction with, and may be integrated with, Reference Monitor 25 and coordinates communication between Reference Monitor 25 and Event Processing Server 100. Event Agent 45 may be adapted to execute on nodes running any commercially prevalent operating system such as UNIX, LINUX, Windows NT, and others. Event Agent 45 may execute on the same physical machine as Reference Monitor 25, or on a different physical machine (not shown) if the machines are networked. If Event Agent 45 and Reference Monitor 25 execute on different physical machines, they will preferably communicate via any secure network protocol that supports message integrity and authentication, such as HTTPS and others. Secure network protocols are desirable so that Event Agent 45 and Reference Monitor 25 can validate the origin and content of communication received.

Event Processing Server 100, in this embodiment, is a software application in communication with one or more Event Agents 45, and may execute on a workstation or server residing within the same sub-network as Event Agents 45, or on a different sub-network connected via a router, gateway or other component. Data transport between Event Agent 45 and Event Processing Server 100 may be accomplished via such secure communication protocols as HTTPS and/or others. In the embodiment depicted, Event Processing Server 100 consists of integrated software components Transceiver 115, Loader 125, Instruction Engine 135, Correlation Engine 145, and Electronic File Storage 155. Transceiver 115 receives event notifications from Event Agent 45 and prepares them for processing. Data is passed to Loader 125, which prepares it for loading to Electronic File Storage 155. In a preferred embodiment, Electronic File Storage 155 is a database organized to provide a constantly updated representation of the status of Event Agents 45 in quickly accessible form. Instruction Engine 135 and Correlation Engine 145 process data in Electronic File Storage 155. Instruction Engine 135 determines whether individual notifications received from nodes warrant policy updates—for instance, determining whether a notification indicates an active attack (such as a buffer overrun attack) or a passive attack (such as a virus)—and determines steps to be taken, such as placing nodes in quarantine, defining system operations which may not be performed on any machine on which a Reference Monitor 25 executes, or tuning operating system, network, or firewall parameters. Instruction Engine 135 passes instructions to be issued to Transceiver 115, which then transmits them to Event Agent 45. Correlation Engine 145 determines whether event notifications, when considered in combination, warrant policy updates. By continuously tracking and analyzing the activity reported by various event agents across one or more networks, Event Processing Server 100 is able to correlate events that may seem unrelated across the distributed system to recognize potential attacks. Attacks may be defined by combinations of events, such as attempting to access a particular resource together with writing a particular file. Other relationships between time and machine resources accessed may also signify an attack.

Reference Monitor 25, Event Agent 45, and Event Processing Server 100 may interact in various ways to provide local protection of individual nodes, remote adaptive protection of one or more nodes, and correlative protection for one or more nodes, as described in detail below.

Local protection of individual nodes is provided by Reference Monitor 25. In the embodiment depicted in FIG. 1, an instruction arrives in 10 from Network 5 to Application 15, which may be an e-mail, browser, terminal server, or other software application running on Node A. This network-based instruction received in 10 causes Application 15 to issue a corresponding request in 20 for System Resources 35 (i.e., access to disk or CPU), which is detected and routed through Reference Monitor 25. If the request does not violate pre-programmed administrative policies, which in the embodiment shown are stored as coded instructions within the Reference Monitor or in a database on hard disk 35, the Reference Monitor allows Application 15 access to System Resources 35 in 30. If the request violates these policies, Reference Monitor 25 may prevent Application 15 from accessing System Resources 35 in 30.

Reference Monitor 25 may work in conjunction with Event Agent 45 and Event Processing Server 100 to provide remote adaptive protection in addition to, or instead of, local protection. Also depicted in FIG. 1, Reference Monitor 25 may perform basic analysis on the instruction arriving in 10 and communicate with Event Agent 45 in 40 as to its nature, as defined by current administrative policy. Event Agent 45 then sends a notification via Network 5 in 50 and 110 (which constitute transfer of the same notification) to Event Processing Server 100 as to the nature of the activity. Event Processing Server 100 receives the notification in 110 from Network 5. Transceiver 115 receives the notification in 110 from Event Agent 45 and prepares it for processing. This data is then passed in 120 to Loader 125, which prepares it for loading, and in 130 initiates the load of the data to Electronic File Storage 155. Once loaded, Instruction Engine 135 and Correlation Engine 145 process the data in Electronic File Storage 155 in 140 and 150, respectively. Instruction Engine 135 determines whether an update to administrative policies is warranted, and determines other steps to be taken, including placing Node A in quarantine, defining system operations which may not be performed on Node A, tuning Node A's operating system, or modifying network or firewall parameters. An update to administrative policies may be issued in response to a single request to access system resources, or a combination of requests to access system resources, reported by Reference Monitor 25. Instruction Engine 135 issues instructions to update policies on Node A in 160 to Transceiver 115, which transmits instructions in 180 and 190 via Network 5 to Event Agent 45.

In certain embodiments, in addition to notifying Event Processing Server 100 software as to intercepted operations, Event Agent 45 application will periodically poll Event Processing Server 100 for administrative policy updates at a pre-programmed frequency. It is preferable for Event Agent 45 software to poll Event Processing Server 100, and not the opposite, for at least one reason. Specifically, the node on which Event Agent 45 executes usually knows the address of Event Processing Server 100, and the opposite may not be true, particularly if the node is a mobile laptop. However, in some cases, with sufficiently stringent security measures protecting Event Processing Server 100, it might be safely programmed to poll or broadcast to Event Agents 45 to alert them to administrative policy updates.

Figure 2:
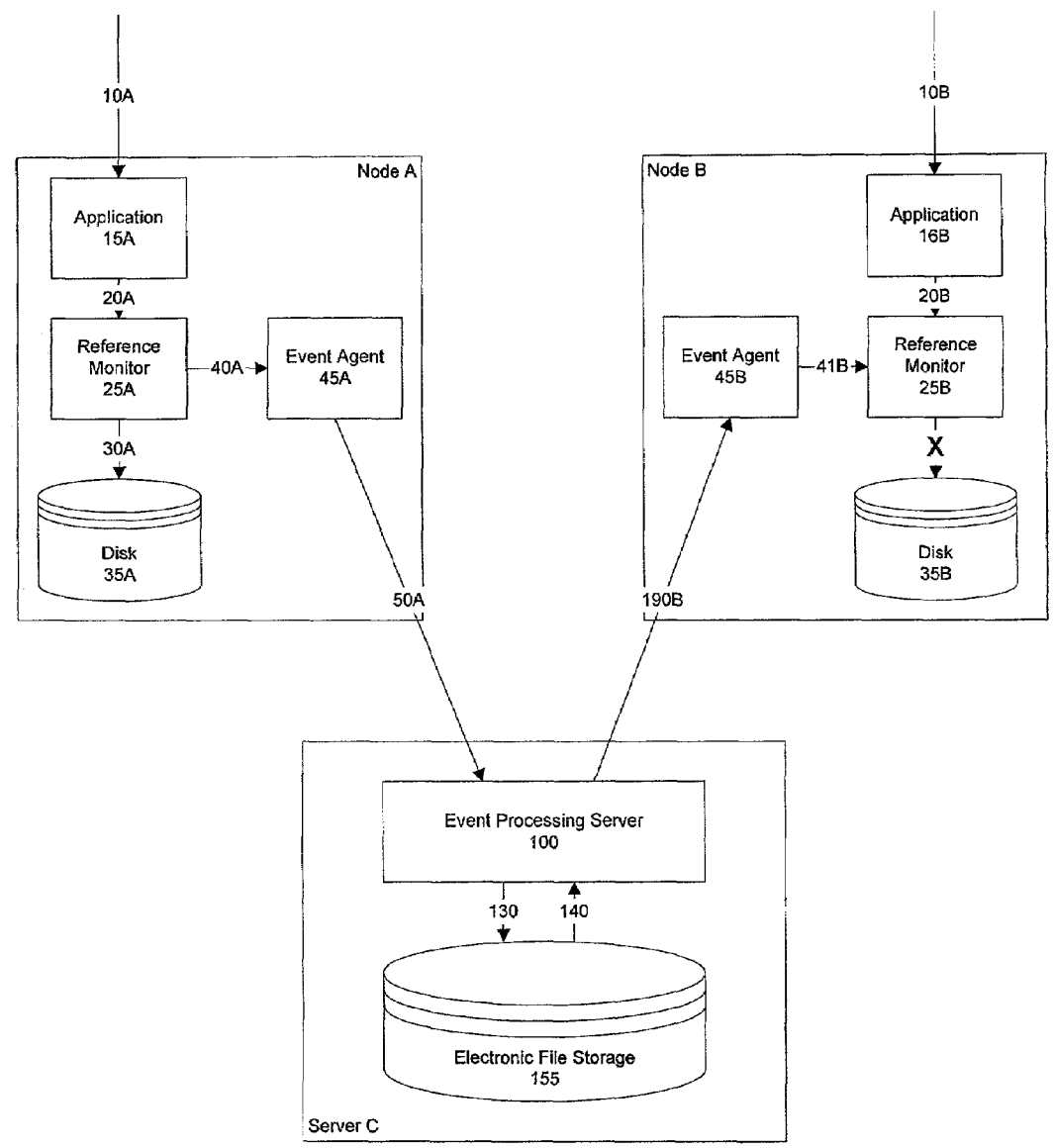
FIG. 2 is a functional block diagram depicting the interaction of system components which define aspects of at least one other embodiment of the invention.

A second embodiment of remote adaptive protection is depicted in FIG. 2, which illustrates an attack to a single node being diagnosed by Event Processing Server 100, which then acts to prevent subsequent attacks on another node. In 10A, data—which may be a request, message, or other content— arrives at Application 15A running on Node A. Application 15A may, for instance, be an e-mail application or other application designed to receive data or requests from other nodes on this or other networks. As described in the foregoing, when Application 15A attempts to access system resources 35A in 20A, the attempt is intercepted by Reference Monitor 25A. Reference Monitor 25A decides whether the attempt to access resources is acceptable based on pre-programmed policies (in which case it allows resource access in 30A), and alerts Event Agent 45A in 40A as to the attempt. Event Agent 45A transmits a notification to Event Processing Server 100 in 50A.

Event Processing Server 100 processes the notification, and determines after loading the data in 130 that the attempt to access resources on Node A should not have been allowed (for instance, by determining that the data arriving from the network was a virus not previously recognized by Reference Monitor 25A). In 190B, it transmits instructions to Event Agent 45B to update administrative policies, so as to restrict access to system resources 35B. System resources 35A, 35B may comprise multiple components, each of which may be accessed separately. For example, an e-mail virus may have attempted to access ten components comprising system resources 35A in sequence, and Event Agent 45B may attempt to restrict access to a subset of those ten components, all ten components, or those and other components within system resources 35B. Event Agents 45A, 45B work in conjunction with Reference Monitor 25A to determine the components accessed. If Reference Monitor 25A is a stateful reference monitor, Reference Monitor 25A recognizes accessed components because it maintains state.

Event Agent 45B passes instructions in 41B to Reference Monitor 25B, which updates its administrative policies to incorporate these instructions. When data arrives from the network in 10B to Application 16B, which need not be the same application as application 15A, a similar attempt to access system resources is initiated in 20B. Reference Monitor 25B, having updated its administrative policies, denies this attempt (denoted with an 'X' in FIG. 2). In this manner, Event Processing Server 100 prevents potentially damaging activity from affecting more than one node on the network, by identifying possibly malicious instructions or requests and preventing them from being executed through updates to administrative policy, preferably in real time.

Figure 3:
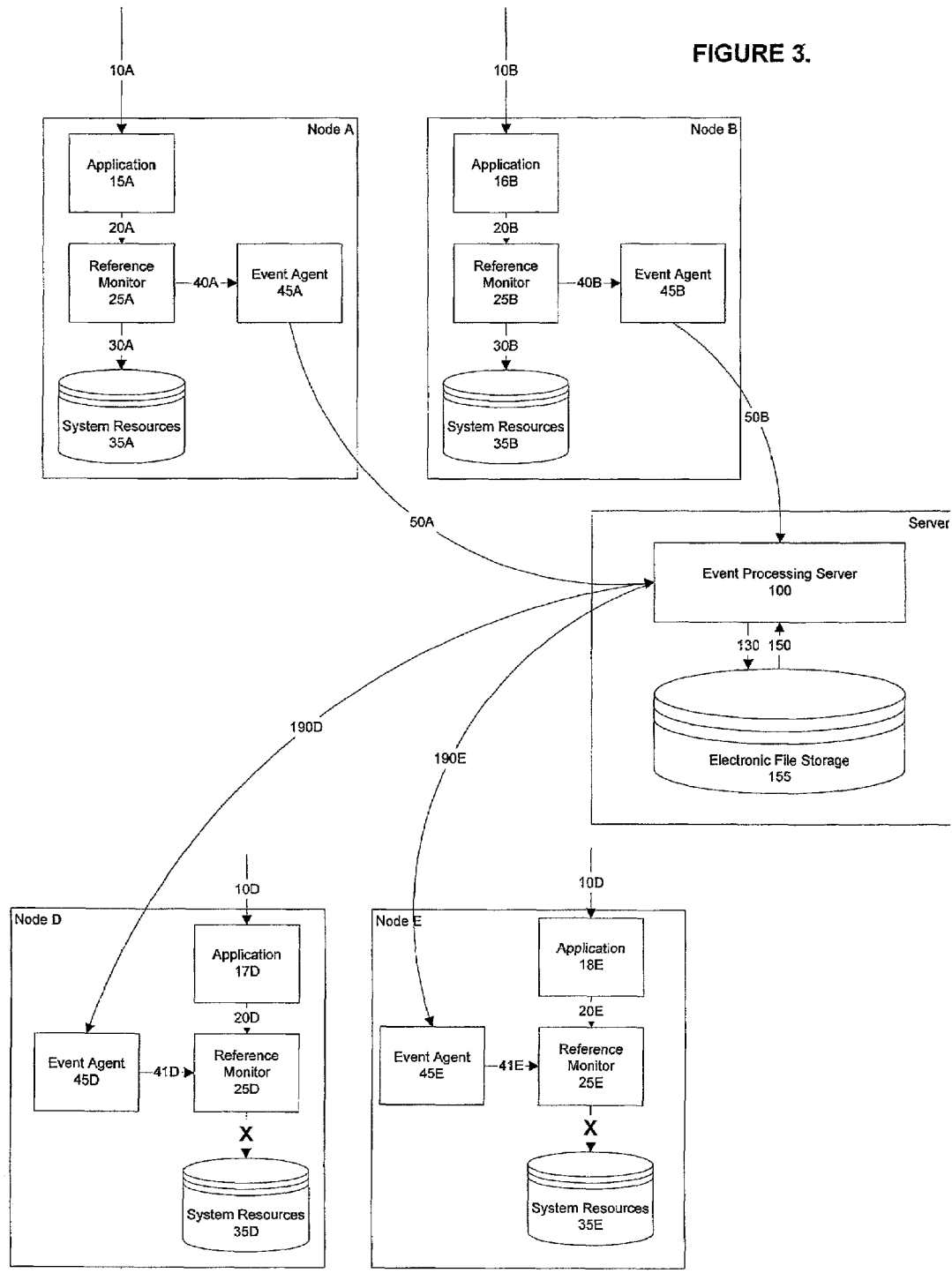
FIG. 3 is a functional block diagram depicting the interaction of system components which define aspects of at least a third embodiment of the invention.

An example of correlative protection is depicted in FIG. 3, which depicts processing of notifications received from multiple nodes to determine that an attack is in progress, and preventing subsequent similar activity on other nodes. As in the foregoing embodiments, in 10A and 10B, data—which may be a request, message, or other content —arrives at Applications 15A and 16B, running on Nodes A and B, respectively. Applications 15A and 16B may, for instance, be e-mail applications or other application designed to receive data or requests from other nodes on this or other networks, but Applications 15A and 16B need not be the same application. As described in the foregoing, when Applications 15A and 16B attempt to access system resources 35A and 35B, in 20A and 20B respectively, the attempts are intercepted by respective Reference Monitors 25A and 25B. The Reference Monitors verify that attempts to access resources are acceptable based on pre-programmed policies, and allow access in 30A and 30B. Reference Monitors 25A and 25B also alert Event Agents 45A and 45B, in 40A and 40B respectively, as to this activity. Event Agents 45A and 45B transmit notification of the activity to Event Processing Server 100, which loads it to Electronic File Storage 155 for processing.

Event Processing Server 100, which in this embodiment includes a Correlation Engine 145 component as depicted in FIG. 1, processes data in Electronic File Storage 155 to determine, by comparing monitored activity to pre-programmed combinations and timeframes, that the actions on Nodes A and B represents possibly harmful activity. Event Agents 45D and 45E running on Nodes D and E receive these notifications, and pass instructions to respective Reference Monitors 25D and 25E to update administrative policies in 41D and 41E respectively. In some embodiments Event Agents 45A and 45B receive these notifications as well, and pass instructions to Reference Monitors 25A and 25B to update administrative policies in 41A and 41E, respectively. In alternative embodiments, instructions may include administrative policy changes specific to certain nodes, placing a particular node in quarantine, tuning network or firewall parameters, or other instructions. In the embodiment depicted, Reference Monitors 25D and 25E implement the updated administrative policy, so that when subsequent network requests arrive at Applications 17D and 18E in 10D and 10E respectively, requests for System Resources 35D and 35E are denied (denoted with an 'X' in FIG. 3). In this manner, Event Processing Server 100 discerns that activity occurring on multiple workstations, when considered in combination, represents potentially malicious or harmful events, and transmits instructions to prevent the activity from subsequently affecting one or more other nodes on the network, in real time.

In certain embodiments, Event Processing Server 100 also disseminates instructions, such as policy updates or network parameter modifications, when polled by Event Agents 45. However, in certain embodiments and/or emergency situations, Event Processing Server 100 may transmit unsolicited instructions to one or more Event Agents 45 to update administrative policies.

In certain embodiments, Event Processing Server 100 sends a notification to relevant Event Agents 45 enabling pre-programmed security measures, although in other embodiments Event Processing Server 100 may issue instructions to impose new measures based upon an analysis of activity observed by Event Agents 45. Security measure updates are preferably performed in real time, by issuing instructions to some number of Event Agents 45, so as to thwart an observed attack as quickly as possible.

In certain embodiments, Event Agent(s) 45, in addition to notifying Event Processing Server 100 of activity detected by Reference Monitor(s) 25, may also notify other entities. In one example, Event Agent(s) 45 may notify network administration staff about the activity by pager, e-mail, SNMP trap, message to any other server or console, SMS message, or other communication method. In another example, Event Agent(s) 45 may notify software applications or other programmed components residing on the network of detected activity. For instance, Event Agent 45 may notify a firewall application, so that the firewall's configuration can be updated. Event Processing Server 100 may also notify these entities using these or other communication methods, either before or after issuing resulting instructions to Event Agents 45.

Figure 6:
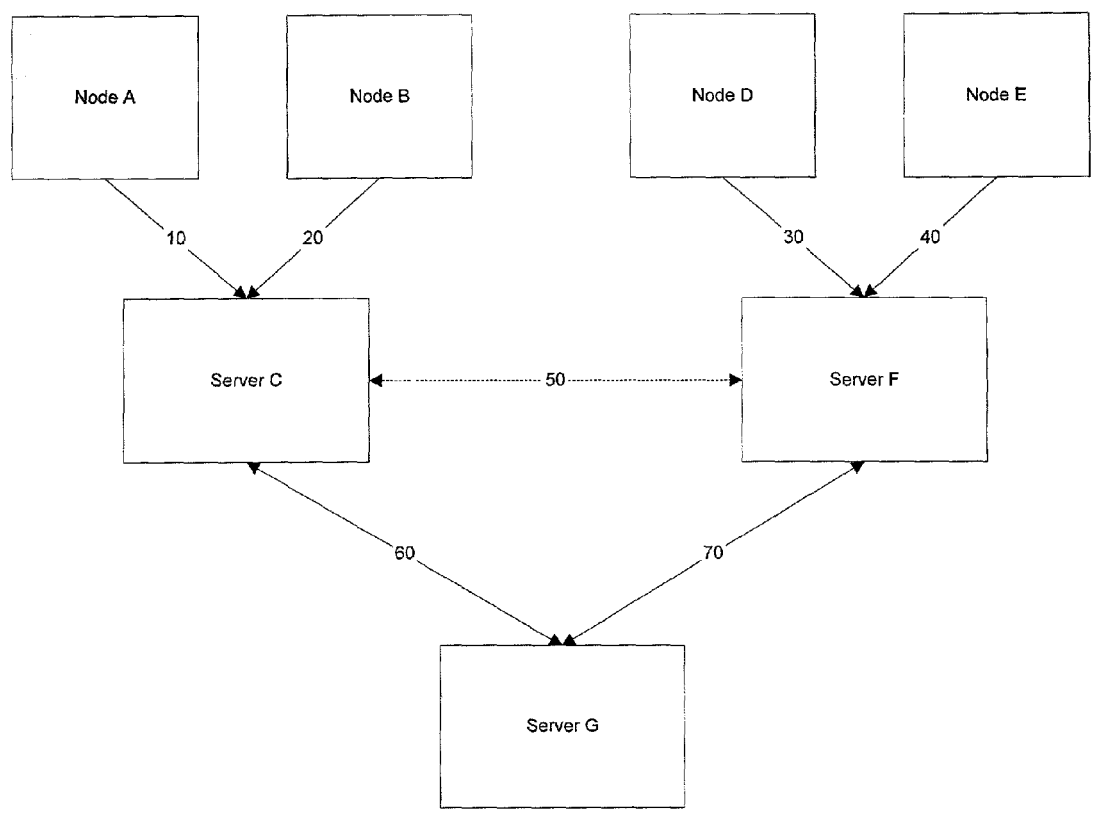
FIG. 6 is a functional block diagram depicting the interaction of system components which define aspects of at least another embodiment of the invention.

Embodiments of the invention may be configured such that certain event processing servers communicate with other event processing servers to provide protection for a larger community of nodes on the network. As depicted in FIG. 6, Nodes A, B are in communication 10, 20 with Server C, which they notify upon recognizing changes in state, and Nodes D, E are in communication 30, 40 with Server F, which they notify upon recognizing changes in state. Servers C, F are in communication 60, 70 with Server G. Server G may or may not be in communication with still other servers (not shown). According to one embodiment of the invention, Servers C or F, upon being notified of a change in state by a node with which they are in communication, communicate the change in state and/or resulting administrative policy modifications to Server G, so that instructions and/or updates may be disseminated to other servers and/or other nodes.

Various embodiments will have various communication structures in place. For instance, the "hierarchical" communication structure comprised of Servers C and F in exclusive communication 60, 70 with Server G may be replaced or supplemented by a "flat" structure comprised of Servers C and F in communication 50 with each other, so that notification need not travel through Server G to reach other servers on the network. Various embodiments may employ a hierarchical structure, a flat structure, or a combination of both.

While the invention has been particularly shown and described with reference to specific embodiments, and variations thereon have been indicated, it will be understood by those skilled in the art that various additional changes in form and detail may be made therein without departing from the spirit and scope of the invention, as defined by the following claims.

The invention claimed is:

1. A method of maintaining a networked computer System including first and second nodes and an event processing server, comprising:
   the first and second nodes detecting changes in state;
   the event processing server receiving notification of the changes in state from the first and second nodes;
   the event processing server correlating the changes in state detected by the first and second nodes;
   the event processing server executing a maintenance decision that affects the first and second nodes, where the maintenance decision is based on the correlating of the changes in state detected by the first and second nodes, where the changes in state are a result of an absence of an event;
   wherein the absence of an event comprises:
   an absence of a request for system resources; and
   an absence of an event message received within a predetermined time frame; and
   where the event processing server is in communication with an interceptor that is inserted in a communication path of the networked computer system,
   at the interceptor, detecting an access request in the communications path;
   generating an event message for the access request;
   transmitting the event message to the event processing server;
   in response, receiving a policy message from the event processing server comprising at least one of: allowing the access request to continue along the communications path, and disallowing the access request to continue along the communications,
where the event processing server executing a maintenance decision that affects the first and second nodes includes determining that at least one of the first and second nodes are subject to a network-borne attack and, in response, performing at least one of:
placing the at least one of the first and second nodes under quarantine; and defining system operations that may not be performed on the at least one of the first and second nodes while under attack,
where the detecting, receiving, correlating, and executing occurs without human intervention.

2. The method of claim 1, where the changes in state are recognized by a reference monitor.

3. The method of claim 2, where the monitor is a stateful reference monitor.

4. The method of claim 1, where the event processing server receiving the notification is the result of one of the first and second nodes reporting to the event processing server, and the event processing server polling the first and second nodes.

5. The method of claim 1, comprising the event processing server updating an operating policy on the network.

6. The method of claim 5, where updating the operating policy includes at least one of requesting security policy changes on at least one node, tuning system parameters on at least one node, and modifying network firewall parameters.

7. The method of claim 5, comprising at least one node enacting the updated operating policy.

8. The method of claim 1, comprising notifying an external entity of actions taken.

9. The method of claim 8, where the external entity is a network administrator.

10. The method of claim 8, where the external entity is a software application executing on an element of the networked computing system.

11. The method of claim 1 where, in response to an intrusion detection, a human operator is prompted and allotted a predetermined period to execute the maintenance decision in accordance with the intrusion detection before the maintenance decision is executed without human intervention.

12. The method of claim 1, where an event agent application periodically polls the event processing server for at least one operating policy update.

13. A method for maintaining a networked computer system including:
at least one node detecting at least one change in state;
an event processing server associated with the networked computing system receiving notification of the at least one change in state from the at least one node; and
the event processing server responding to the notification by executing a maintenance decision, where the maintenance decision is based on the at least one change in state from the at least one node, the at least one change in state being a result of an absence of an event;
where the absence of an event comprises:
an absence of a request for system resources; and
an absence of an event message received within a predetermined time frame; and
where the event processing server is in communication with an interceptor that is inserted in a communication path of the networked computer system,
at the interceptor, detecting an access request in the communications path;
generating an event message for the access request;
transmitting the event message to the event processing server;
in response, receiving a policy message from the event processing server comprising at least one of: allowing the access request to continue along the communications path, and
disallowing the access request to continue along the communications,
where the event processing server executing a maintenance decision that affects the first and second nodes includes determining that at least one of the first and second nodes are subject to a network-borne attack and, in response, performing at least one of:
placing the at least one of the first and second nodes under quarantine;
and defining system operations that may not be performed on the at least one of the first and second nodes while under attack,
where the detecting, receiving, and responding occurs without human intervention.

14. The method of claim 13, where the change in state is recognized by a reference monitor.

15. The method of claim 14, where the reference monitor is a stateful reference monitor.

16. The method of claim 13, where the event processing server receiving the report is the result of the at least one node reporting to the event processing server, and the event processing server polling the at least one node.

17. The method of claim 13, where the maintenance decision affects the at least one node detecting the change in state.

18. The method of claim 13, where the maintenance decision affects at least one node other than the node detecting the change in state.

19. The method of claim 13, comprising the event processing server updating an operating policy on the network.

20. The method of claim 19, where updating the operating policy includes at least one of requesting security policy changes on at least one node, tuning system parameters on at least one node, and modifying network firewall parameters.

21. The method of claim 19, comprising at least one node enacting the updated operating policy.

22. The method of claim 13, comprising notifying an external entity of actions taken.

23. The method of claim 22, where the external entity is a software application executing on the network.

24. A method for maintaining a node on a networked computer system including:
at least one node detecting a change in state;
an event processing server associated with the networked computing system receiving notification of the at least one change in state from the at least one node; and
the event processing server responding to the notification by executing a maintenance decision, where the maintenance decision is based on the at least one change in state from the at least one node,
at least one node reacting to the change in state, where the change in state is a result of an absence of an event;
where, the absence of an event comprises:
an absence of a request for system resources; and
an absence of an event message received within a predetermined time frame;
where the event processing server is in communication with an interceptor that is inserted in a communication path of the networked computer system,
at the interceptor, detecting an access request in the communications path; generating an event message for the access request;

transmitting the event message to the event processing server;

in response, receiving a policy message from the event processing server comprising at least one of: allowing the access request to continue along the communications path, and disallowing the access request to continue along the communications, where the event processing server executing a maintenance decision that affects the first and second nodes includes determining that at least one of the first and second nodes are subject to a network-borne attack and, in response, performing at least one of:

placing the at least one of the first and second nodes under quarantine;

and defining system operations that may not be performed on the at least one of the first and second nodes while under attack, where the at least one node detecting and reacting to the change in state occurs without human intervention.

25. The method of claim 24, where the change in state is recognized by a reference monitor.

26. The method of claim 25, where the reference monitor is a stateful reference monitor.

27. The method of claim 24, comprising the event processing server responding to the notification by updating an operating policy on the network.

28. The method of claim 27, where updating the operating policy includes at least one of requesting updates to security policy on at least one node, tuning system parameters on at least one node, and modifying network firewall parameters.

29. The method of claim 27, comprising the at least one node enacting the updated operating policy.

30. The method of claim 24, comprising notifying an external entity of actions taken.

31. The method of claim 30, where the external entity is a network administrator.

32. The method of claim 30, where the external entity is a software application executing on the network.

33. A computer-readable medium storing computer executable instructions that when executed by a computer cause the computer to perform a method, the method comprising:

detecting a change in state of a node, an event processing server associated with the networked computing system receiving notification of the at least one change in state from the at least one node; and the event processing server responding to the notification by executing a maintenance decision, where the maintenance decision is based on the at least one change in state from the at least one node, where the change in state is a result of an absence of an event;

wherein the absence of an event comprises:

an absence of a request for system resources; and an absence of an event message received within a predetermined time frame; and reacting to the detected change in state, where the event processing server is in communication with an interceptor that is inserted in a communication path of the networked computer system, at the interceptor, detecting an access request in the communications path;

generating an event message for the access request;

transmitting the event message to the event processing server;

in response, receiving a policy message from the event processing server comprising at least one of: allowing the access request to continue along the communications path, and disallowing the access request to continue along the communications, where the event processing server executing a maintenance decision that affects the first and second nodes includes determining that at least one of the first and second nodes are subject to a network-borne attack and, in response, performing at least one of:

placing the at least one of the first and second nodes under quarantine;

and defining system operations that may not be performed on the at least one of the first and second nodes while under attack, where the at least one node detecting and reacting to the change in state occurs without human intervention.

34. The computer-readable medium of claim 33, the method comprising communicating the change in state to an event processing server.

35. The method of claim 24, where, in response to an intrusion detection, a human operator is prompted and allotted a predetermined time period to execute the maintenance decision in accordance with the intrusion detection before the maintenance decision is executed without human intervention.

36. The computer-readable medium of claim 34, the method comprising processing maintenance instructions received from the event processing server.

37. The computer-readable medium of claim 33, the method comprising transmitting notification to a network administrator of actions taken.

38. A method for maintaining a networked computer system including:

at least one node detecting at least one change in state;

an event processing server associated with the networked computing system receiving notification of the at least one change in state from the at least one node;

the event processing server responding to the notification by dispensing a maintenance decision, where the maintenance decision is based on the at least one change in state from the at least one node, the at least one change in state being a result of an absence of an event; and where the absence of an event comprises:

an absence of a request for system resources; and an absence of an event message received within a predetermined time frame where the event processing server is in communication with an interceptor that is inserted in a communication path of the networked computer system, at the interceptor, detecting an access request in the communications path;

generating an event message for the access request;

transmitting the event message to the event processing server;

in response; receiving a policy message from the event processing server comprising at least one of: allowing the access request to continue along the communications path, and disallowing the access request to continue along the communications, where the event processing server executing a maintenance decision that affects the first and second nodes includes determining that at least one of the first and second nodes are subject to a network-borne attack and, in response, performing at least one of:

placing the at least one of the first and second nodes under quarantine;

and defining system operations that may not be performed on the at least one of the first and second nodes while under attack, where the at least one node detecting and reacting to the change in state occurs without human intervention.

39. The method of claim 38, comprising executing, by a human operator, the maintenance decision on at least one node on the networked computer system.

40. The method of claim 38, comprising: executing, without human intervention, the maintenance decision on at least one node on the networked computer system.

41. The method of claim 40, where a human operator is prompted and allotted a predetermined period to execute the maintenance decision before it is executed without human intervention.

* * * * *